(12) United States Patent
Jackson et al.

(10) Patent No.: US 6,349,169 B1
(45) Date of Patent: Feb. 19, 2002

(54) ATTACHMENT STRUCTURE FOR VESSEL FITTING

(75) Inventors: Barry Neild Jackson, Woodbury; Gary W. Gauer, Cottage Grove; Ronald Iannelli, Burnsville, all of MN (US)

(73) Assignee: Water Heater Innovations, Inc., Eagan, MN (US)

( * ) Notice: Subject to any disclaimer, the term of this patent is extended or adjusted under 35 U.S.C. 154(b) by 0 days.

(21) Appl. No.: 09/211,218

(22) Filed: Dec. 14, 1998

(51) Int. Cl.[7] .............................. F24H 1/20; H05B 3/78
(52) U.S. Cl. ........................................ 392/447; 392/454
(58) Field of Search ................................... 392/441, 447, 392/449, 451, 454, 500, 501; 126/344

(56) References Cited

U.S. PATENT DOCUMENTS 3,116,402 A * 12/1963 Drugmand .................. 392/455
4,588,851 A * 5/1986 Turner ......................... 174/5 R
5,163,119 A * 11/1992 Windon ....................... 392/449
5,371,831 A * 12/1994 Gauer et al. ................. 392/501

* cited by examiner

Primary Examiner—San Paik
Assistant Examiner—Thor Campbell
(74) Attorney, Agent, or Firm—Moore & Hansen

(57) ABSTRACT

A vessel of substantially uniform curvilinear shape comprising at least one area of a different curvilinear shape that is adapted to closely conform to and engage a number of commonly contoured curvilinear segments on a housing member constructed and arranged to receive an outer covering panel in close fitting relation therewith is disclosed. In addition a method of manufacturing a vessel which comprises at least one area of a different curvilinear shape is also disclosed.

22 Claims, 4 Drawing Sheets

ATTACHMENT STRUCTURE FOR VESSEL FITTING

BACKGROUND OF THE INVENTION

The present invention is drawn to a curvilinear structure formed integral to a vessel for containing fluids that permits the attachment thereto of a standardized fitting regardless of the nominal diameter of the vessel. Specifically, the present invention is drawn to the formation of a standard radius in the sidewall of the vessel wherein the radius of the remainder of the circumference of the vessel may differ from the standard radius. The standard radius is common to a plurality of vessels of varying diameter and is arranged to be complementary with a standard fitting or fittings which may be mounted to the vessel in a flush manner.

In the fabrication of vessels for containing fluids, it is often necessary to mount a fitting to the sidewall of the vessel. These fittings may comprise access panels, junction boxes, or gauges. In addition, it is often very desirable to mount the aforementioned fittings to the sidewall of a vessel in a flush manner so as to prevent the infiltration of liquids into or out of the vessels. Presently, when manufacturing vessels such as for water heaters, it is necessary to have on hand numerous fittings with mating surfaces of varying radii to fit each of the plurality of vessels of varying diameter. The variation in size between fittings has resulted in higher inventory costs and higher fabrication costs. The use of standardized fittings reduces the total inventory costs, lowers the fabrication costs associated with the manufacture of both the fittings and the vessels, and lends itself to modern just-in-time manufacturing techniques.

Therefore, it is an objective of this invention to provide a structure or structures for mounting a standard fitting upon any of a series of vessels of varying size.

SUMMARY OF THE INVENTION

The present invention provides a structure which permits a standard fitting or housing to be mounted upon any of a number of variously sized vessels, thereby obviating the need to maintain stocks of various sized fittings or housings. Though the present invention is herein described as being used with a vessel for containing fluids, namely a water heater, it is to be understood that the invention can easily be adapted to other types of vessels of varying application and materials. Furthermore, it is contemplated that the present invention may have applications outside the field of fluid containment vessels.

A vessel incorporating the present invention typically has a substantially uniform curvilinear shape and comprises at least one area that has a different curvilinear shape that is adapted to closely conform to and engage commonly contoured curvilinear segments on at least one housing member constructed and arranged to receive an outer covering panel in close fitting relation therewith.

The vessel may be the outer shell of a water heater having an inner, water containing shell positioned inside it in a spaced apart relation thereto so as to form an annular space between the vessel and the shell. An insulating material substantially fills the annular space between the vessel and the shell in surrounding relation to the housing member. The housing member is typically an electrical junction box for making an electrical connection to at least one electric heating element that extends into the inner shell. The curvilinear segments of the housing member are curved mounting flanges on opposing sides of the housing member that are arranged to mate with the area of different curvilinear shape.

The outer covering panel has curved, peripheral edges formed to substantially conform to the curvilinear shape of the area of different curvilinear shape. The outer covering panel typically comprises an intermediate bracket and a covering panel. The intermediate bracket has a curvilinear shape arranged and constructed to conform to the area of different curvilinear shape of the vessel and is also arranged to be secured to the housing member in such a way as to secure the wall of the vessel therebetween. The intermediate bracket also has formed therein attachment means for releasably attaching the covering panel over the intermediate bracket.

The present invention also comprises a method of manufacturing a vessel which is integral to the practice of the invention disclosed herein. A first step in this method involves forming a vessel having a substantially regular curvilinear shape, the vessel being any one of a number of predetermined sizes. Integral to this vessel is formed a geometric discontinuity having a curvilinear shape different from the remainder of the vessel. The curvilinear shape of the geometric discontinuity is identical for all of the predetermined sizes for the vessel. A housing member having a mating surface complementary to the curvilinear shape of the geometric discontinuity is also provided. The housing member is identical for all of the predetermined sizes of the vessels. The provided housing member is then secured to the geometric discontinuity in a manner that is identical for all of the predetermined sizes of the vessel.

DETAILED DESCRIPTION OF THE INVENTION

Figure 1:
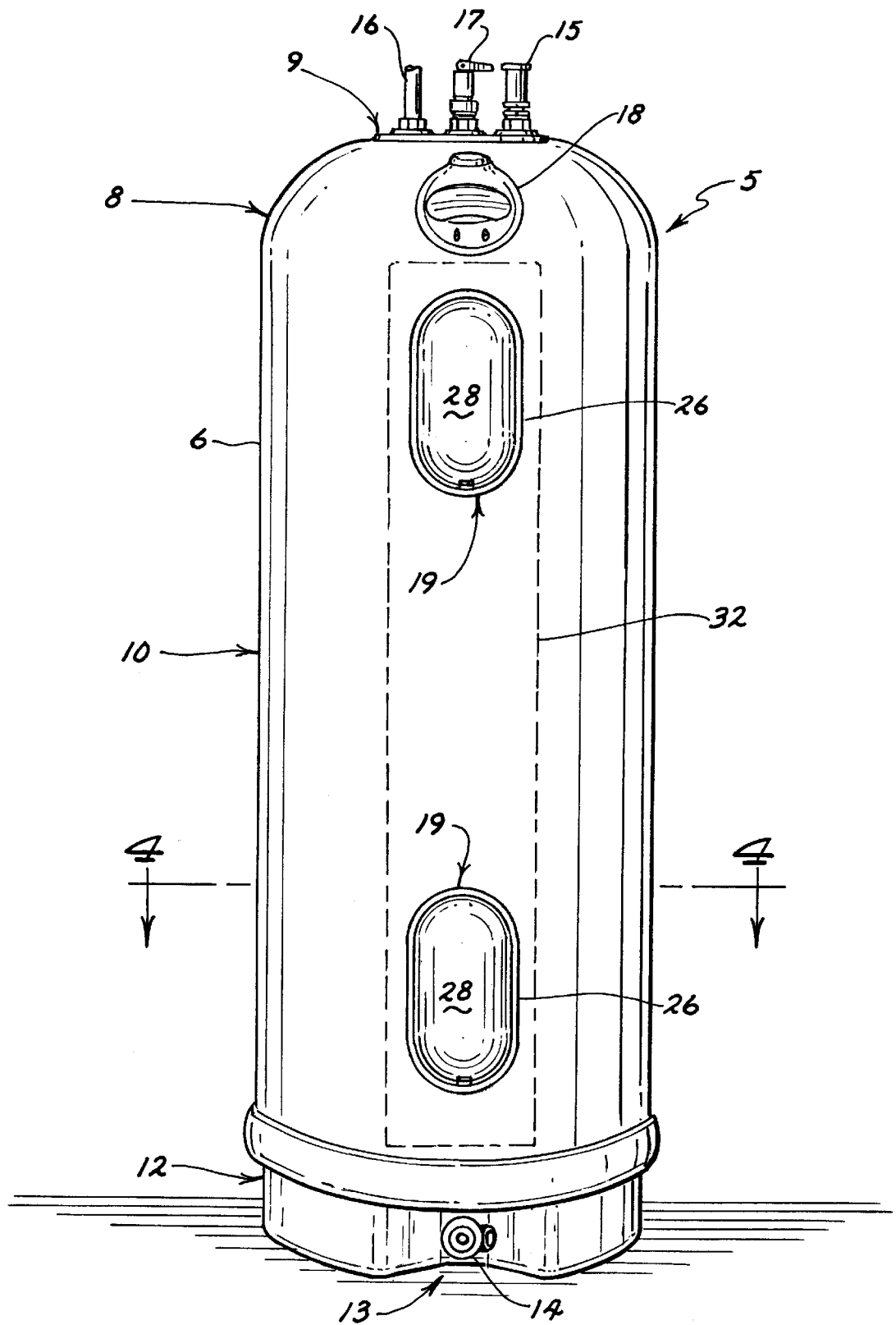
FIG. 1 is a front perspective view of a water heater embodying the standard radius of the present invention.
Figure 4:
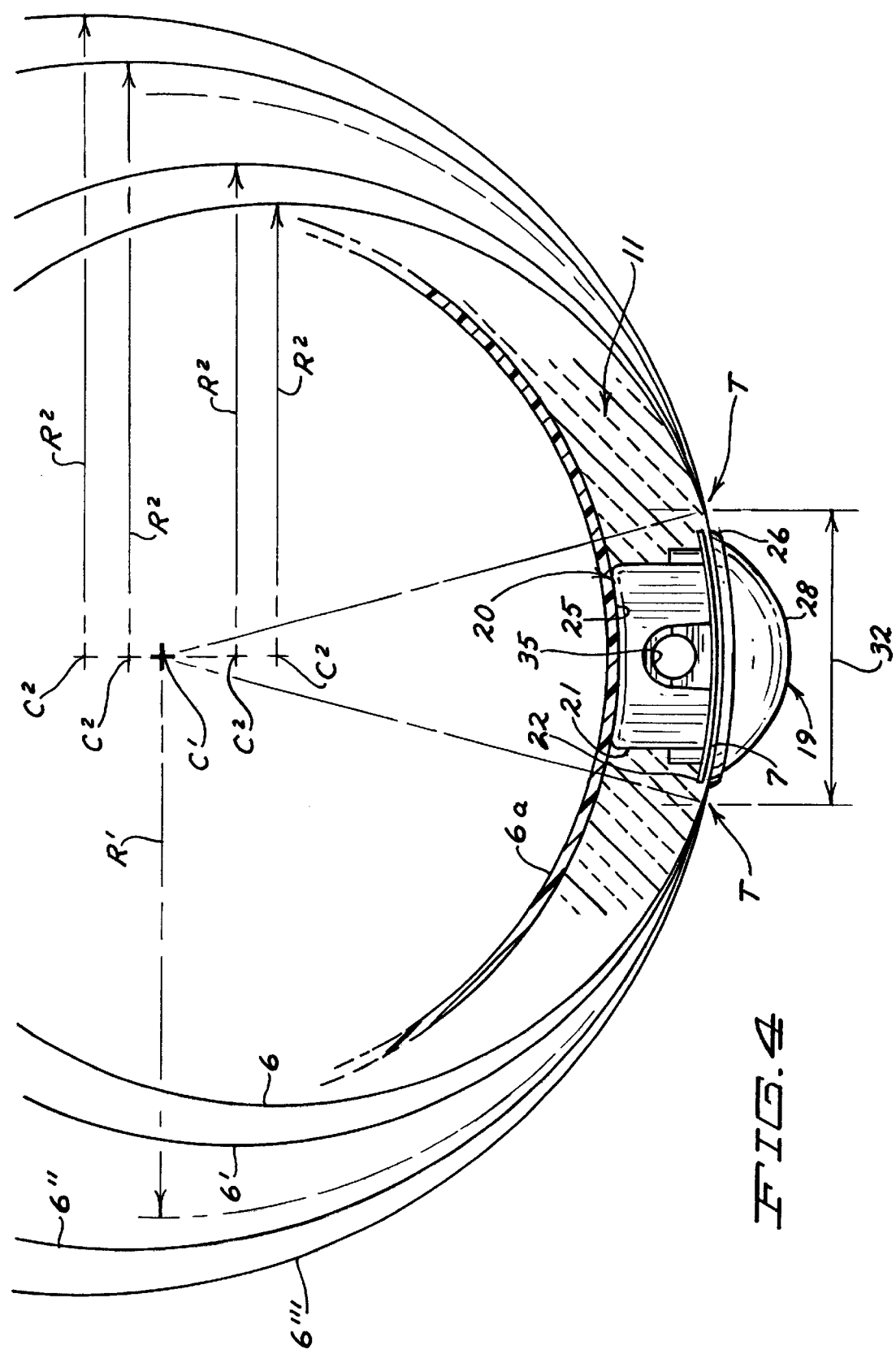
FIG. 4 is a partial top sectional view taken along section lines 4—4 of FIG. 1 illustrating the housing mated to the area of standard radius of water heater tanks of various sizes.

FIG. 1 shows a front, elevational view of a water heater 5 comprising an outer shell 6 and an inner tank 6a as shown in FIG. 4. The outer shell 6 of the water heater 5 has a substantially uniform curvilinear shape, which is in this embodiment substantially cylindrical. The top portion 8 of the outer shell 6 has a large radius fillet and acts as a gradual transition between the substantially cylindrical central portion 10 of the outer shell 6 and the substantially flat top 9 of the outer shell 6. The bottom portion 12 of the outer shell 6 is also substantially cylindrical and contains at least one recess 13. Recess 13 has disposed therein a spigot 14 which may be a drain for the inner tank of the water heater 5. The top 9 of the outer shell 6 is arranged to have pass therethrough an inlet 15, an outlet 16, and a pressure relief valve 17, all arranged to be in fluidic connection with the inner tank 6a of the water heater 5 and arranged in known manner to convey and control the flow of water through the water heater 5.

An electrical connection box 18 is mounted at the top portion 8 of the outer shell 6 and is arranged to receive electrical conductors (not shown) which power the heating elements (not shown) of the water heater 5. The water heater 5 illustrated in FIG. 1 also has attached thereto two junction boxes 19. For the purposes of the present invention all junction boxes 19 are identical, irrespective of the size or shape of the water heater 5. Use of a standard junction box 19, capable of being mounted upon any of a series of water heaters 5 having varying sizes, reduces the number of variously sized junction boxes that would otherwise be required to be kept on hand. The use of a standard junction box 19 therefore reduces overhead expenses and manufacturing costs associated with the production of the water heaters 5. It must also be kept in mind that the box 19 may be arranged for uses other than as an electrical junction box. For instance, box 19 may be arranged to conceal or protect a valve, gauge, or spigot. For the purposes of this application the term "electrical junction box" should be construed to include boxes which may be mounted integral to and used in conjunction with a vessel for containing fluids as disclosed herein.

Figure 2:
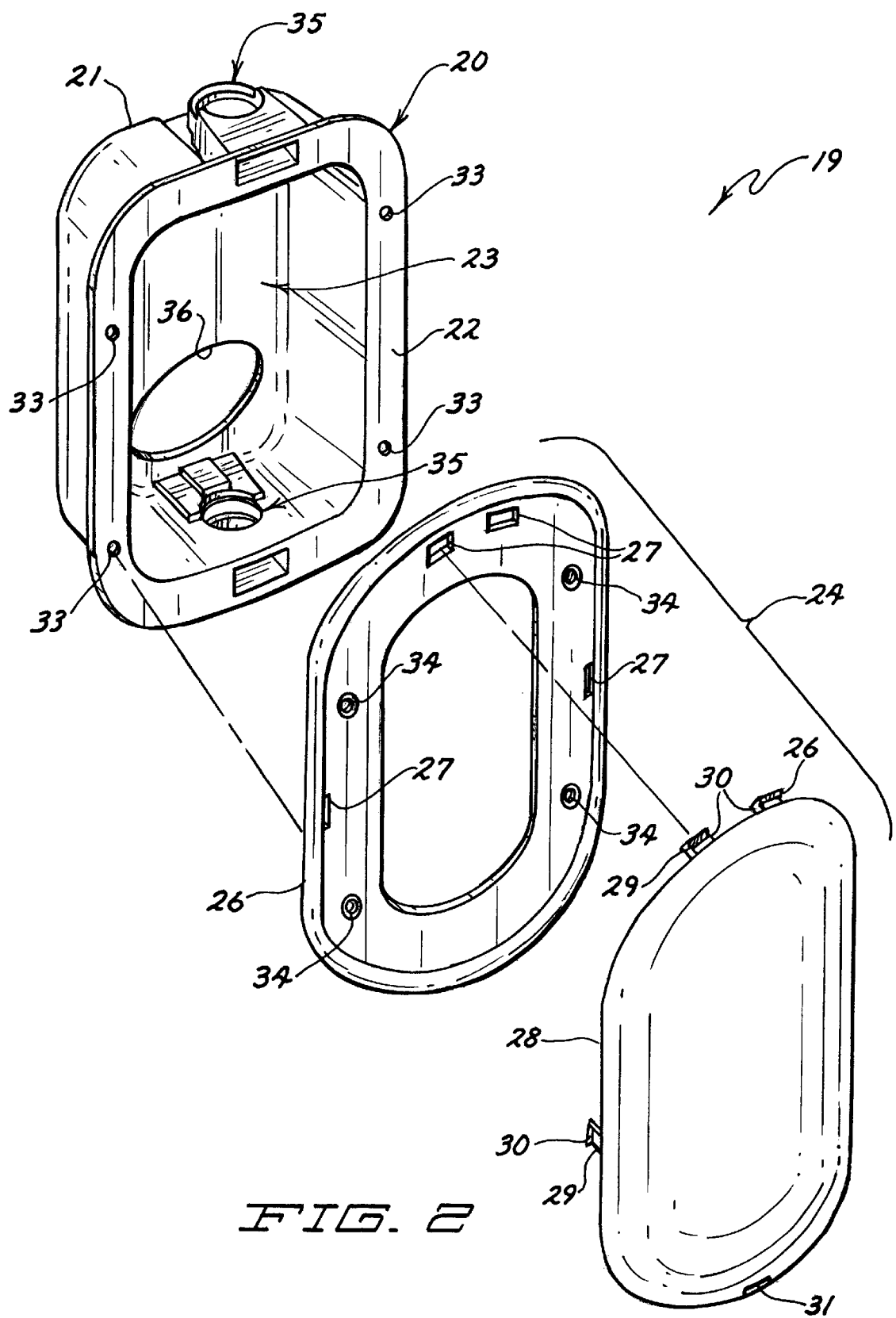
FIG. 2 is an exploded perspective view of a housing constructed and arranged to mate with the standard radius of the present invention.
Figure 3A:
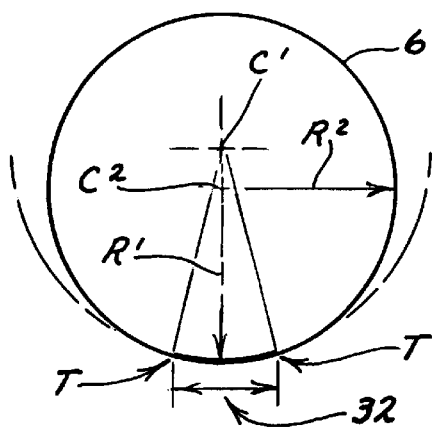
FIGS. 3a–3d are top plan views of the outer shell of a water heater illustrating the offset relationship between the area of standard radius and various water heater tank diameters.
Figure 3B:
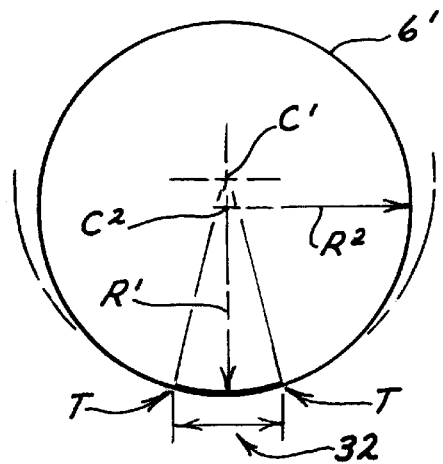
Figure 3D:
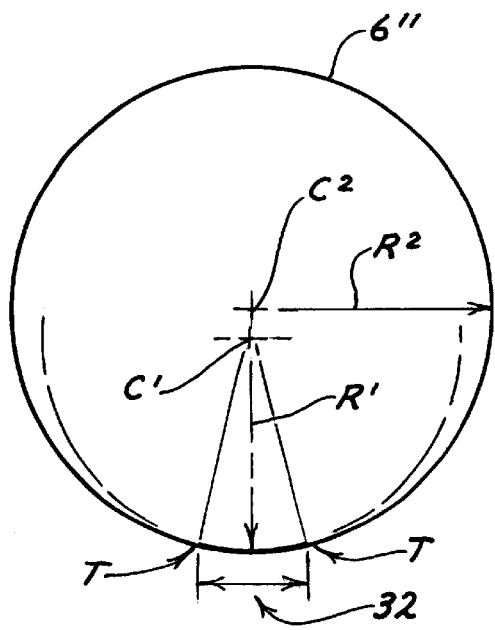
Figure 3C:
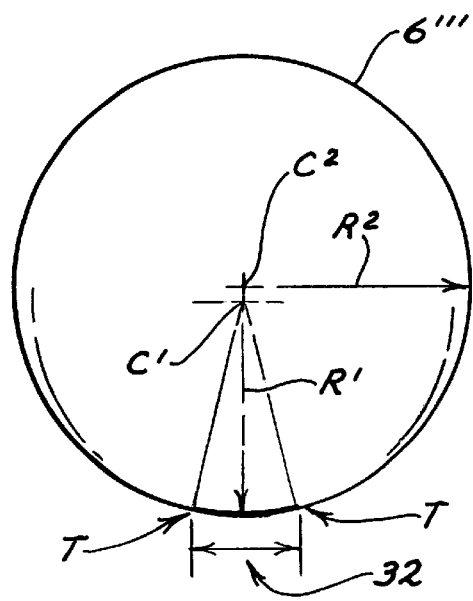

FIG. 2 illustrates in detail the construction of the junction box 19. The junction boxes 19 are comprised of a housing member 20 and a cover 24. The cover 24 is in turn comprised of an intermediate plate 26 and a cover panel 28 that is arranged to be releasably attachable to the intermediate plate 26. As can be seen, the housing member 20 is comprised of a substantially rectangular housing 21 having an open outer surface defined by a plurality of curvilinear segments which form a flange 22. The flange 22 of the housing member 20 is arranged to be complimentary with the inner surface of an area 32 of the wall of the outer shell 6 that is geometrically discontinuous, i.e. has a different curvilinear shape from the remainder of the outer shell 6. The purpose of the area of geometric discontinuity 32 is to provide a common mounting surface on the outer shell 6 of a water heater 5 to which a junction box 19 may be attached. Identical areas of geometric discontinuity 32 that are complementary to the flange 22 of the housing member 20 are formed into the outer shell 6 of each of a series of variously sized water heaters 5, such that a standard junction box 19 that is identical for each distinctly sized water heater 5 may be attached thereto. This purpose is furthered by providing junction box 20 with an inner curved surface 25 having a radius permitting it to abut against inner shell 6a in conforming relation thereto. Insulation 11 fills the annular space between inner and outer shells 6a and 6.

In order to facilitate the addition of necessary electrical components, the housing 20 of junction box 19 is provided with electrical conduit ports 35 at its top and bottom. Conduit ports 35 permit electrical conductors (not shown) to be strung from the electrical connection box 12, to the housing(s) 20. Where a water heater 5 has more than one junction box 19, electrical conductors may be strung between the housings 20 of the junction boxes 19. The electrical conductors are required to power electrical components such as heating elements (not shown) that may be mounted through component port 36 at the back of the housing 20 of the junction box 19.

Referring next to FIG. 4, a junction box 19 is seen as mounted to the outer shell 6 at an area of geometric discontinuity 32. Housing member 20 is mounted against the inner surface of the outer shell 6 at the area of geometric discontinuity 32 in registration with an opening 7 that is formed through the wall of the outer shell 6. The opening 7 formed through the outer shell 6 is roughly the same size and shape as open face 23 of the housing member 20 bounded by the flange 22. The opening 7 through the outer shell wall 6 permits communication between the exterior of the outer shell 6 and the interior of the rectangular housing 21 of the housing member 20. The cover 24 is affixed to the outer surface of the outer shell 6 of the water heater 5 at the area of geometric discontinuity 32 in registration with the opening 7 through the outer shell wall 6 and the housing member 20 of the junction box 19.

Typically, intermediate plate 26 is attached to the outer surface of the outer shell 6 by means of a mechanical fastener or an appropriate adhesive so as to secure the wall of the outer shell 6 between the flange 22 of the housing member 20 and the intermediate plate 26 as shown in FIG. 4. Intermediate plate 26 has formed therein attachment means arranged to permit releasable attachment of the cover panel 28 to the intermediate plate 26. The attachment means may comprise a plurality of apertures 27 arranged to mate with a plurality of tabs 29 extending from the cover panel 28. Hooks 30 formed on the distal ends of the tabs 29 extend through the apertures 27 of the intermediate plate 26 and engage the inner surface of the intermediate plate 26 to secure the cover panel 28 thereto. Gentle prying pressure applied to an aperture 31 is sufficient to remove cover panel 28 from intermediate plate 26. It is to be understood that the structure of the apertures 27, tabs 29, and aperture 31 may be altered significantly without exceeding the scope of the present invention.

FIGS. 3a–3d are a series of top plan views of the outer shell 6 illustrated in FIG. 1. FIGS. 3a–3d illustrate the radially offset relationship between the area of standard radius and various water heater tank diameters. As indicated above, the outer shell 6 of a water heater 5 is a curvilinear substantially cylindrical shape having a substantially circular cross section as indicated in FIGS. 3a–3d. In the preferred embodiment of the present invention, the area of geometric discontinuity 32 comprises a curvilinear shape having a fixed radius $R^1$ with a center point $C^1$ that is offset from the center $C^2$ of the outer shell 6 of the water heater 5. Depending upon the requisite volume of the outer shell 6 of the water heater 5, it is possible that the radius $R^2$ and center point $C^2$ of the outer shell 6 may be the same as the radius $R^1$ and center point $C^1$ of the area of geometric discontinuity 32. The outer shell illustrated in FIGS. 3a–3d has been variously labeled with the reference numerals 6, 6', 6", and 6'", respectively, to distinguish the variously sized shells of differing embodiments. Note that in FIGS. 3a and 3b that the radii $R^1$ of the areas of geometric discontinuity 32 are larger than the radii $R^2$ of outer shell embodiments 6 and 6' of the water heater 5 and that in FIGS. 3c and 3d that the radii $R^1$ geometric discontinuity 32 are smaller than the radii $R^2$ of outer shell embodiments 6" and 6'" of the water heater 5.

Though the shape of the water heater 5 and area of geometric discontinuity of the present invention are, in conjunction with the preferred embodiment, described as being essentially circular in cross section, it is to be understood that various curvilinear shapes that are not essentially circular in cross section may be utilized without exceeding the scope of the present invention. For example, the present invention may be readily adapted to the outer shell of a water heater that has an elliptical cross-sectional shape or an irregular curvilinear shape. Likewise, the cross-sectional shape of the area of geometric discontinuity need not be circular, but instead could be elliptical, parabolic, or even an irregular curvilinear shape.

The substantially circular cross section of the outer shell 6 is modified near the area of geometric discontinuity 32 so as to create a smooth transition T therebetween. One advantage to utilizing a substantially circular area of geometric discontinuity 32 with the substantially cylindrical outer shell 6 of the water heater 5 is that the area of transition T between the area of geometric discontinuity 32 and the remainder of the outer shell 6 may be made in a manner that is unobtrusive and generally pleasing to the eye.

In FIG. 1, the outer shell 6 of the water heater 5 is illustrated as having a single vertically oriented area of geometric discontinuity 32 which extends from below the lower junction box 19 to above the upper junction box 19. While the embodiment of FIG. 1 is the preferred embodiment of the present invention, it is to be understood that an area of geometric discontinuity 32 need only be large enough to permit a single junction box 19 to be mounted thereto. Therefore, the areas of geometric discontinuity 32 may be varied in size, number, and location, depending upon the desired number and arrangement of junction boxes required for a given water heater 5 without exceeding the scope of the present invention. For example, the water heater outer shell 6 may comprise a single vertically oriented area of geometric discontinuity 32 that extends over substantially the entire height of the outer shell 6, as illustrated in FIG. 1, or, the water heater outer shell 6 may comprise a plurality of areas of geometric discontinuity 32 that are slightly larger than the junction boxes 19 and which are disposed in a predetermined pattern upon the surface of the water heater 5. Another example of a water heater 5 according to the present invention has areas of geometric discontinuity 32 formed on a front side and a back side of the water heater 5 or in the four quadrants of the water heater 5 and extending either the entire height of the outer shell 6 of the water heater or some portion thereof.

Forming an area of geometric discontinuity 32 into an outer shell 6 of a water heater 5 is an integral part of a method of manufacturing a water heater 5. A vessel incorporating the present invention such as the outer shell 6 of a water heater 5 may be formed of plastic as by blow molding, fabricated from metals such as steel or aluminum, or formed of a composite material such as fiber glass or the like using fabrication techniques appropriate to the chosen material. In the preferred embodiment of the present invention, a vessel having a substantially regular curvilinear shape and having any one of a number of predetermined sizes is formed in a blow molding procedure utilizing a mold appropriate to the desired final shape and size of the vessel. Areas of geometric discontinuity 32 are formed into the vessel in a desired arrangement by replacing portions of the mold used to form the vessel with mold portions which have formed thereon a negative image of the areas of geometric discontinuity 32 and transition areas T. It is important to reiterate that the areas of geometric discontinuity 32 are of uniform size and shape irrespective of the size or arrangement of the vessel into which they are being formed. In this manner, the areas of geometric discontinuity 32 of a vessel of a particular size will be identical to the areas of geometric discontinuity 32 formed into vessels of different sizes. Where the vessels are formed of steel or other materials not suitable for a molding process, identical areas of geometric discontinuity may be formed using any number of well known stamping, rolling, replacement by welding or other suitable fabrication techniques.

Housing members 20 of junction boxes 19, having mating surfaces defined by flange 22, are next attached to the inner surface of the areas of geometric discontinuity 32 of each outer shell 6 such that the flange 22 is in mating contact with the inner surface of an area of geometric discontinuity 32. It is preferred that the flange 22 be sealingly mated to the area of geometric discontinuity 32. Openings 7, which allow access to the interior of the housing member 20, may be preformed in the areas of geometric discontinuity 32 of the vessel or may be formed once the housing members 20 have been secured to the outer shells 6. It is to be understood that a single, standard junction box 19 design is mounted to the identical areas of geometric discontinuity 32 of each of the outer shells 6 of varying size. In addition, the manner whereby a junction box 19 is attached to an outer shell 6 of a water heater 5, i.e. by use of mechanical fastener or adhesive, is identical for the outer shells 6 of varying size. Once the housing members 20 have been attached to the inner surface of the outer shells 6 at the areas of geometric discontinuity 32, the cover 24 is secured to the exterior surface of the outer shells 6 over the housing members 20. The intermediate plate 26 of the cover 24 is secured directly to the exterior surface of the outer shell 6 by means of mechanical fasteners or adhesives and cover panel 28 is releasably secured to the intermediate plate 26 by apertures 27 and tabs 29. In the embodiment shown in FIG. 2, aligned apertures 33 and 34 are provided in housing member 20 and plate 26, respectively, to receive threaded fasteners.

By forming identical areas of geometric discontinuity 32 into vessels of varying size, it is possible to utilize a standard configuration of a junction box 19 for each of the vessels of varying size, thereby obviating the need to maintain stocks of variously sized junction boxes 19 each usable for specific sizes of vessels only. While the preferred embodiments of the present invention have been described, it is to be understood that various changes, adaptations, and modifications may be made therein without departing from the spirit of the invention and the scope of the appended claims.

What is claimed is:

1. A vessel of substantially uniform curvilinear shape, the vessel comprising at least one area of a different curvilinear shape adapted to closely conform to and engage commonly contoured curvilinear segments on at least one housing member constructed and arranged to receive an outer covering panel in close fitting relation therewith.

2. The vessel of claim 1 wherein:
   said vessel is the outer shell of a water heater;
   an inner, water containing shell is positioned inside of said vessel in spaced apart relation thereto so as to form an annular space between the vessel and the shell;
   insulation substantially filling the annular space between the vessel and the shell in surrounding relation to the housing member; and
   said housing member being an electrical junction box and said curvilinear segments being curved mounting flanges on opposing sides of the housing member.

3. The vessel of claim 2 wherein:
   the electrical junction box is apertured to receive and provide electrical connection to an electric heating element sized to be inserted inside the inner shell.

4. The vessel of claim 2 wherein:
   said outer, covering panel has curved, peripheral edges formed to substantially conform to the curvilinear shape of the area of different curvilinear shape.

5. The vessel of claim 2 wherein:
   said outer covering panel comprises an intermediate plate and a covering panel, the intermediate plate having a curvilinear shape arranged and constructed to conform to the area of different curvilinear shape of the vessel;
   the intermediate plate being secured to the housing member overlying relation to said mounting flanges so as to sandwich the outer shell of the vessel therebetween.

6. The vessel of claim 2 wherein:
the intermediate plate has attachment means formed therein for releasably attaching the covering panel over the intermediate plate.

7. The vessel of claim 1 wherein:
said vessel is of generally cylindrical shape and has a predetermined radius and which further comprises at least one area of different curvilinear shape having a substantially circular cross section and a radius differing from that of the remainder of the vessel.

8. A vessel having a substantially circular cross section and comprising at least one area of radial discontinuity, said area of radial discontinuity having a curvilinear shape and being arranged to have mounted thereon in a flush manner a housing member having a complementary curvilinear mating surface.

9. The vessel of claim 8 further comprising two areas of radial discontinuity.

10. The vessel of claim 9 where the two areas of radial discontinuity are vertically aligned.

11. The vessel of claim 10 wherein the two areas of radial continuity have substantially identical radii.

12. A vessel for containing fluids having a circumference with a first predetermined radius, the vessel also having an area of a second predetermined radius, the second predetermined radius being arranged to be complementary with a radius formed into a mating surface of a housing member to be attached to the vessel.

13. The vessel of claim 12 further comprising at least two areas of the second predetermined radius.

14. An area of attachment for a fitting upon a vessel of generally cylindrical shape, the point of attachment comprising:
a discontinuity upon the surface of the vessel, the discontinuity having a curvilinear shape differing from that of the remainder of the vessel, the discontinuity further having a radius arranged to mate with a housing member.

15. In a vessel of generally cylindrical shape and having a substantially circular cross-section with a predetermined radius, an improvement comprising:
an area of radial discontinuity having a radius different than said predetermined radius, the area permitting the attachment thereto of a fitting of predetermined geometry, the fitting mating with the area of radial discontinuity regardless of the diameter of the cross section of the remainder of the vessel.

16. In a series of generally cylindrical vessels having substantially circular cross-sections of varying diameter, an improvement upon each of the vessels in the series comprising:
a common area of radial discontinuity formed integral to each of the series of vessels, each of the radial discontinuities being arranged to permit the attachment of at least one fitting, the fittings being of an identical geometry regardless of the diameter of the respective vessels in the series.

17. A method of manufacturing a vessel comprising the steps of:
forming a vessel defined by a wall having a substantially regular curvilinear shape, the vessel being any one of a number of predetermined sizes;

forming into the vessel wall an area of discontinuity having a curvilinear shape different from the remainder of the vessel, the curvilinear shape of the discontinuity being identical for any one of the number of predetermined sizes for the vessel;

providing a housing member having a mating surface complementary to the curvilinear shape of the discontinuity, the housing member being identical for any one of the number of predetermined sizes for the vessel; and mounting the housing member upon the discontinuity in a manner identical for any one of the number of predetermined sizes for the vessel.

18. In a series of vessels of generally uniform curvilinear shape and varying size, a preselected wall segment of each vessel having a uniform curvilinear shape over its entire extent throughout the series of vessels that is substantially congruent to the commonly contoured curvilinear shape of a fitting member.

19. The series of vessels of claim 18 wherein the curvilinear shape of the preselected portion of each vessel is generally indistinguishable from the remaining portion of each of the series of the vessels.

20. The series of vessels of claim 18 wherein the series of vessels comprise an outer shell of a water heater, the water heater further comprising:
an inner, water containing shell positioned inside of said outer shell in spaced apart relation thereto so as to form an annular space between the outer shell and the inner shell, the annular space being filled with an insulating material, the fitting member comprising a junction box having curved mounting flanges constructed and arranged to be substantially congruent with the uniform curvilinear shape of the preselected wall segment of each vessel.

21. In one or more vessels of generally uniform curvilinear shape and varying size, a preselected wall segment of each vessel having a uniform curvilinear shape over its entire extent throughout the series of vessels that is substantially congruent to the commonly contoured curvilinear shape of a fitting member.

22. In a series of vessels of generally uniform curvilinear shape and varying size, a preselected wall segment of each vessel having a uniform curvilinear shape over its entire extent throughout the series of vessels that is substantially congruent to the commonly contoured curvilinear shape of a uniform fitting member that is constructed and arranged for attachment to the curvilinear preselected wall segment of each of the vessels in the series.

* * * * *